United States Patent
Horii et al.

(10) Patent No.: US 10,549,503 B2
(45) Date of Patent: Feb. 4, 2020

(54) CARBON FIBER-REINFORCED CARBON COMPOSITE AND METHOD OF MANUFACTURING THE SAME

(75) Inventors: Toshiyuki Horii, Kagawa (JP); Hitoshi Seki, Kagawa (JP); Shinnya Kubo, Kagawa (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 1031 days.

(21) Appl. No.: 14/232,436

(22) PCT Filed: Jul. 9, 2012

(86) PCT No.: PCT/JP2012/067433
§ 371 (c)(1),
(2), (4) Date: Jan. 13, 2014

(87) PCT Pub. No.: WO2013/015101
PCT Pub. Date: Jan. 31, 2013

(65) Prior Publication Data
US 2014/0170370 A1    Jun. 19, 2014

(30) Foreign Application Priority Data
Jul. 28, 2011   (JP) ................................. 2011-165542

(51) Int. Cl.
  *B32B 5/26*   (2006.01)
  *B32B 5/12*   (2006.01)
  (Continued)

(52) U.S. Cl.
  CPC ................ *B32B 5/26* (2013.01); *B32B 5/12* (2013.01); *B32B 7/02* (2013.01); *B32B 37/10* (2013.01);
  (Continued)

(58) Field of Classification Search
  CPC ........... B32B 18/00; B32B 37/10; B32B 5/12; B32B 5/26; B32B 7/02; C04B 35/645;
  (Continued)

(56) References Cited

U.S. PATENT DOCUMENTS 5,191,486 A * 3/1993 Sato ...................... B29C 70/207
  138/125
5,205,888 A * 4/1993 Mochida ................. C04B 35/83
  156/242

(Continued)

FOREIGN PATENT DOCUMENTS

JP   60 191057   9/1985
JP   03 205359   9/1991
(Continued)

OTHER PUBLICATIONS

JPlatPat machine english translation of JP06-116031A, retrieved Apr. 18, 2016.*

(Continued)

*Primary Examiner* — Frank J Vines
*Assistant Examiner* — Laura B Figg
(74) *Attorney, Agent, or Firm* — Oblon, McClelland, Maier & Neustadt, L.L.P.

(57) ABSTRACT

A plate-shaped carbon fiber-reinforced carbon composite has a longitudinal length-to-widthwise length ratio of more than 1. The carbon fiber-reinforced carbon composite is such that at least two layers that are a first carbon fiber-reinforced carbon composite layer in which carbon fibers are placed in the carbonaceous matrix and are oriented in the longitudinal direction and a second carbon fiber-reinforced carbon composite layer different in the arrangement of the carbon fibers from the first carbon fiber-reinforced carbon composite layer are stacked, the first carbon fiber-reinforced carbon composite layer forms an outermost layer of at least one plate (Continued)

surface, the thickness thereof is 70% or more of the thickness of the carbon fiber-reinforced carbon composite, and the longitudinal bending elastic modulus is 150 GPa or more. The first carbon fiber-reinforced carbon composite layer in which the carbon fibers are aligned in the longitudinal direction is placed only on an outermost layer of one or both of plate surfaces and another site is a carbon fiber-reinforced carbon composite layer different in the arrangement of the carbon fibers from the first carbon fiber-reinforced carbon composite layer; hence, the longitudinal bending elastic modulus is significantly increased and warping, peeling, or cracking during usage and interlayer delamination due to gases produced during manufacture are suppressed.

15 Claims, 2 Drawing Sheets

(51) Int. Cl.
*B23B 7/02* (2006.01)
*B32B 37/10* (2006.01)
*B32B 7/02* (2019.01)

(52) U.S. Cl.
CPC ........ *Y10T 156/10* (2015.01); *Y10T 428/2495* (2015.01); *Y10T 428/24124* (2015.01)

(58) Field of Classification Search
CPC ............ C04B 35/83; C04B 2235/5264; C04B 2235/5272; C04B 2235/77; C04B 2235/94; C04B 2235/95; C04B 2235/96; C04B 2237/385; C04B 2237/584; C04B 2237/586
See application file for complete search history.

(56) References Cited

U.S. PATENT DOCUMENTS

| | | | | |
|---|---|---|---|---|
| 6,110,847 A | * | 8/2000 | Yamamoto | D03D 15/00 139/426 R |
| 2006/0093802 A1 | * | 5/2006 | Tsai | B29C 70/088 428/216 |
| 2006/0153669 A1 | * | 7/2006 | Miller | B25J 9/0012 414/800 |
| 2007/0237954 A1 | * | 10/2007 | Kienzle | C04B 35/573 428/375 |
| 2011/0111123 A1 | * | 5/2011 | La Forest | C04B 35/83 427/249.2 |

FOREIGN PATENT DOCUMENTS

| | | | |
|---|---|---|---|
| JP | 4-316611 A | | 11/1992 |
| JP | 05148017 A | * | 6/1993 |
| JP | 06 116031 | | 4/1994 |
| JP | 06116031 A | * | 4/1994 |
| JP | 1994116031 | * | 4/1994 |
| JP | 11 001376 | | 1/1999 |
| JP | 2000 086365 | | 3/2000 |
| JP | 2003 062786 | | 3/2003 |
| JP | 2009 160685 | | 7/2009 |
| JP | 2010 127340 | | 6/2010 |
| JP | 2011 046543 | | 3/2011 |
| KR | 10-2010-0135798 A | | 12/2010 |

OTHER PUBLICATIONS

"Test Method Number 20" by Texwipe, Determination of Basis Weight. Retreived Jul. 30, 2016.*
"Calcine" entry by Merriam-Webster online Retreived Aug. 1, 2016.*
Mallick "Metal, Ceramic, and Carbon Matrix Composites" section 7.3 pp. 548-553 "Carbon Matrix Composites" Published Nov. 2007.*
Aiba JPlatPat English translation of JP 1994-116031 Falsely Unidirectional Reinforced C/C Composite Material and its Production, retreived Aug. 1, 2016.*
Mallick "Carbon Matrix Composites" section 7.3, pp. 546-553, retrieved Aug. 1, 2016.*
TexWipe "Test Method 20" procedure, retrieved Aug. 1, 2016.*
Merriam Webster entry for "Calcine" retreived Aug. 1, 2016.*
Aiba JPlatPat English translation of JP 1994-116031 Falsely Unidirectional Reinforced C/C Composite Material and its Production, retreived Aug. 1, 2016 (Year: 2016).*
Mallick "Carbon Matrix Composites" section 7.3, pp. 546-553, retrieved Aug. 1, 2016 (Year: 2016).*
TexWipe "Test Method 20" procedure, retrieved Aug. 1, 2016 (Year: 2016).*
Merriam Webster entry for "Calcine" retreived Aug. 1, 2016 (Year: 2016).*
Yumitate et al, "Production of Carbon fiber-reinforced carbon material for general purpose," JP05-0148017A, English translation from JPlatPat (Year: 1993).*
International Search Report dated Oct. 2, 2012 in PCT/JP12/067433 Filed Jul. 9, 2012.
Office Action dated Aug. 30, 2018 in the corresponding Korean Application No. 10-2014-7002237 with Unedited Computer-Generated English Translation citing documents AO and AP therein 7 pages.
Office Action dated Feb. 25, 2019 in the corresponding Korean Application No. 10-2014-7002237 with Unedited Computer-Generated English Translation.

* cited by examiner

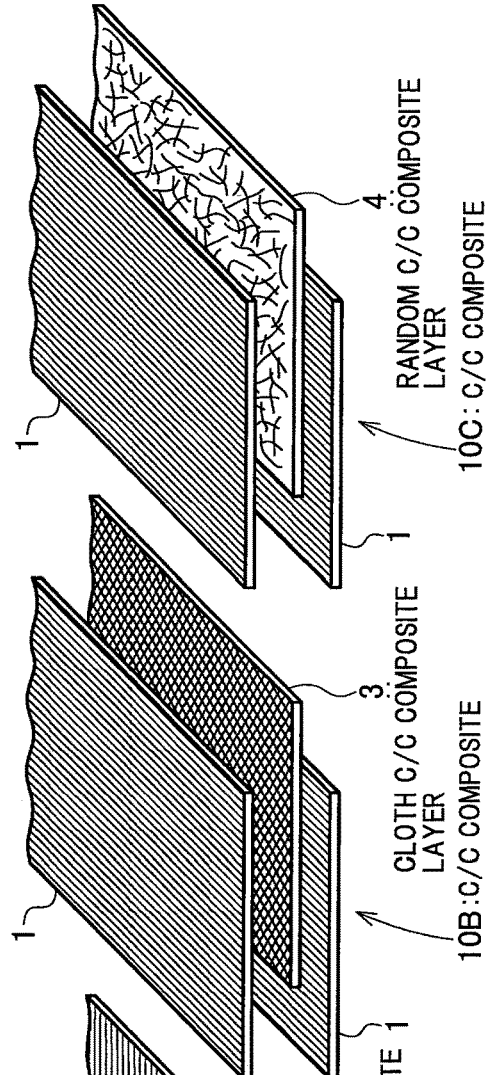

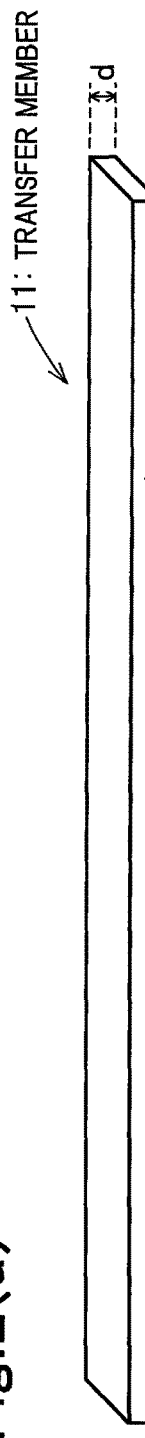
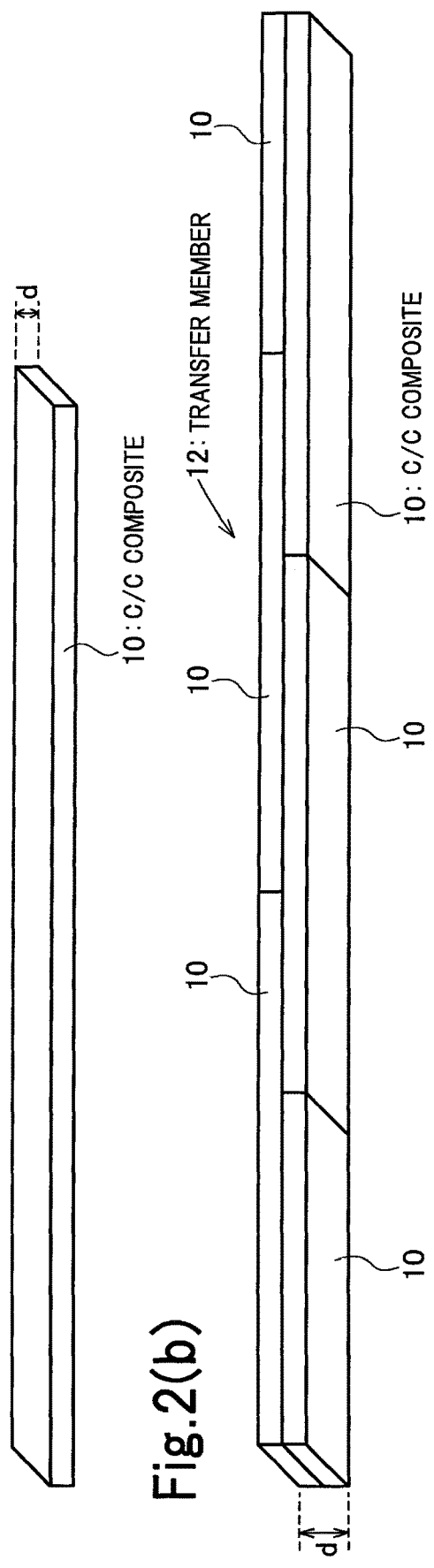
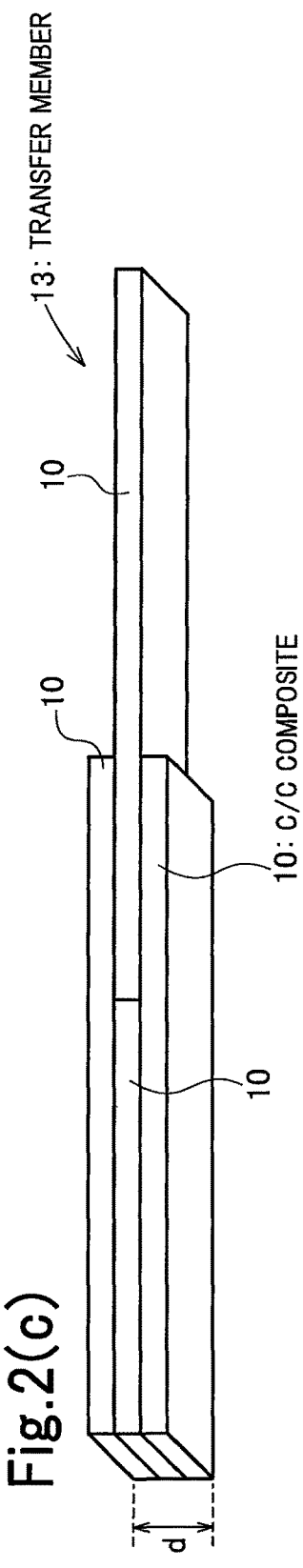

CARBON FIBER-REINFORCED CARBON COMPOSITE AND METHOD OF MANUFACTURING THE SAME

CROSS REFERENCE TO RELATED APPLICATIONS

The present application is a 35 U.S.C. § 371 national stage patent application of International patent application PCT/JP2012/067433, filed on Jul. 9, 2012, published as WO/2013/015101 on Jan. 31, 2013, the text of which is incorporated by reference, and claims the benefit of the filing date of Japanese application no. 2011-165542, filed on Jul. 28, 2011, the text of which is also incorporated by reference.

FIELD OF INVENTION

The present invention relates to a carbon fiber-reinforced carbon composite and methods of manufacturing the same and particularly relates to an elongate carbon fiber-reinforced carbon composite which has a large longitudinal bending elastic modulus and which is suitable as a transfer member for sheet workpieces such as liquid crystal substrates, printed circuit boards, and glass substrates and a method of manufacturing the carbon fiber-reinforced carbon composite.

The present invention also relates to a transfer member composed of the carbon fiber-reinforced carbon composite.

BACKGROUND OF INVENTION

Hitherto, those made of metal (mainly Al or stainless steel), ceramic, or a carbon fiber-reinforced plastic composite material (CFRP) have been used as transfer members for sheet workpieces such as liquid crystal substrates, printed circuit boards, and glass substrates, (Patent Documents 1 to 3). Metal or ceramic transfer members are heavy in weight and have disadvantages such as poor handleability and poor operability. The ceramic transfer members are brittle and have a problem with poor impact resistance.

In contrast, CFRP transfer members are lightweight and have high bending stiffness and excellent vibration damping properties. However, the CFRP transfer members have limited heat resistance due to a resin material and cannot be used in usage environments with a high temperature of 300° C. or higher.

On the other hand, carbon fiber-reinforced carbon composite materials (C/C composites) composed of carbon fibers and carbonaceous matrixes have high heat resistance, low weight, and excellent wear resistance and therefore have been mainly used as aerospace and aircraft materials such as rocket nozzle materials and aircraft brake materials (Patent Documents 4, 5, and 6).

LIST OF DOCUMENTS

Patent Document

Patent Document 1: Japanese Patent Publication 2003-62786 A
Patent Document 2: Japanese Patent Publication 2010-127340 A
Patent Document 3: Japanese Patent Publication 2009-160685 A
Patent Document 4: Japanese Patent Publication S60-191057 A
Patent Document 5: Japanese Patent Publication H3-205359 A
Patent Document 6: Japanese Patent Publication 2011-46543 A

OBJECT AND SUMMARY OF INVENTION

C/C composites have low weight, high heat resistance, and excellent mechanical properties such as wear resistance and therefore are promising as constituent materials for transfer members used in high-temperature environments. However, in the case where a C/C composite is formed into an elongate member like a transfer member, the C/C composite has insufficient longitudinal bending elastic modulus and therefore the elongate member cannot exhibit bending stiffness equivalent to that of CFRP transfer members or good vibration damping properties.

In the case of trying to increase the longitudinal bending elastic modulus of an elongate member made of a C/C composite, it is conceivable that carbon fibers are oriented by aligning the carbon fibers in the longitudinal direction thereof. An elongate member which is made of a C/C composite and which is manufactured in such a way that carbon fibers are simply aligned in the longitudinal direction has problems with warping and peeling (cracking) and is not suitable for practical use.

In Patent Document 3, a multilayer structure in which layers of carbon fiber woven fabric (cloth) are placed between layers is used to improve the strength of a CFRP transfer member. In the case of applying such a multilayer structure to a C/C composite, there is a problem in that cracking or interlayer delamination occurs because the ventilation of gas produced in a calcination or carbonization step is poor.

In the case of trying to manufacture an elongate member with a large longitudinal bending elastic modulus in such a way that carbon fibers, used in a C/C composite, having high elastic modulus are oriented by aligning the carbon fibers in the longitudinal direction, the carbon fibers have high elastic modulus and therefore are difficult to handle and operations in steps such as preimpregnation, cutting, stacking, and the like are particularly difficult. This is unsuitable for industry-level production.

It is an object of the present invention to provide a carbon fiber-reinforced carbon composite which solves the above conventional problems, which has significantly high longitudinal bending elastic modulus, which is easy to manufacture and process, and which is free from problems with warping, peeling, and cracking.

The inventors have carried out intensive investigations to solve the above problems. As a result, the inventors have found that the following composite has significantly increased longitudinal bending elastic modulus and is free from problems with warping, peeling, and cracking during usage and interlayer delamination due to gases produced during manufacture is suppressed: a carbon fiber-reinforced carbon composite which is not manufactured in such a way that carbon fibers are simply aligned in the longitudinal direction but is manufactured in such a way that a carbon fiber-reinforced carbon composite layer (first carbon fiber-reinforced carbon composite layer) in which carbon fibers are aligned in the longitudinal direction is provided on an outermost layer of one or both of plate surfaces and another site is a carbon fiber-reinforced carbon composite layer different in the arrangement of the carbon fibers from the first carbon fiber-reinforced carbon composite layer.

The present invention has been accomplished on the basis of this finding and is as summarized below.

A carbon fiber-reinforced carbon composite according to a first aspect is composed of carbon fibers and a carbonaceous matrix, has a longitudinal length-to-widthwise length ratio of more than 1, and is plate-shaped. The carbon fiber-reinforced carbon composite is characterized in that at least two carbon fiber-reinforced carbon composite layers that are a first carbon fiber-reinforced carbon composite layer in which the carbon fibers are placed in the carbonaceous matrix and are oriented in the longitudinal direction and a second carbon fiber-reinforced carbon composite layer different in the arrangement of the carbon fibers from the first carbon fiber-reinforced carbon composite layer are stacked, the first carbon fiber-reinforced carbon composite layer forms an outermost layer of at least one plate surface of the carbon fiber-reinforced carbon composite, the thickness of the first carbon fiber-reinforced carbon composite layer is 70% or more of the thickness of the carbon fiber-reinforced carbon composite, and the longitudinal bending elastic modulus thereof is 150 GPa or more.

A carbon fiber-reinforced carbon composite according to a second aspect is characterized in that, in the first aspect, the carbon fibers in the second carbon fiber-reinforced carbon composite layer are oriented in a direction crossing the longitudinal direction.

A carbon fiber-reinforced carbon composite according to a third aspect is characterized in that, in the first or second aspect, the FAW of the first carbon fiber-reinforced carbon composite layer is 1,000 g/m$^2$ to 20,000 g/m$^2$, the FAW of the second carbon fiber-reinforced carbon composite layer is 200 g/m$^2$ to 5,000 g/m$^2$, and the FAW of the carbon fiber-reinforced carbon composite is 1,200 g/m$^2$ to 25,000 g/m$^2$.

A carbon fiber-reinforced carbon composite according to a fourth aspect is characterized in that, in any one of the first to third aspects, the carbon fibers are pitch-based carbon fibers.

A carbon fiber-reinforced carbon composite according to a fifth aspect is characterized in that, in any one of the first to fourth aspects, the volumetric content of the carbon fibers is 40% to 70%.

A carbon fiber-reinforced carbon composite according to a sixth aspect is characterized in that, in any one of the first to fifth aspects, the bulk density is 1.65 g/cm$^3$ or more.

A carbon fiber-reinforced carbon composite according to a seventh aspect is characterized in that, in any one of the first to sixth aspects, a plurality of unidirectional prepregs in which the carbon fibers are aligned in a fiber axis direction are stacked such that alignment directions of the carbon fibers cross each other and a carbon fiber-reinforced resin form obtained by hot-pressing an obtained laminate is calcined and is carbonized.

A carbon fiber-reinforced carbon composite according to an eighth aspect is characterized in that, in the seventh aspect, the prepregs have a thermosetting resin content of 15% to 45% by weight.

A carbon fiber-reinforced carbon composite according to a ninth aspect is characterized in that, in the seventh or eighth aspect, the carbon fiber-reinforced carbon composite is obtained by subjecting a preform obtained by calcining and carbonizing the carbon fiber-reinforced resin form to densification treatment including the following steps (1) and (2) at least once:

(1) an impregnation step of impregnating the preform with the impregnating material which is at least one selected from the group consisting of coal-tar pitch, petroleum-tar pitch, and resin and (2) a carbonization step of carbonizing the impregnating material by calcination after the impregnation step.

A transfer member according to a tenth aspect comprises the carbon fiber-reinforced carbon composite according to any one of the first to ninth aspects.

A method of manufacturing a carbon fiber-reinforced carbon composite according to an eleventh aspect is a method of manufacturing the carbon fiber-reinforced carbon composite according to any one of the first to ninth aspects and is characterized in that a plurality of the unidirectional prepregs in which the carbon fibers are aligned in the fiber axis direction are stacked such that alignment directions of the carbon fibers cross each other and the carbon fiber-reinforced resin form is obtained by heating and pressing the obtained laminate, is calcined, is carbonized, is impregnated with the impregnating material which is at least one selected from the group consisting of coal-tar pitch, petroleum-tar pitch, and resin, and is then calcined again such that the impregnating material is carbonized.

A method of manufacturing a carbon fiber-reinforced carbon composite according to a twelfth aspect is characterized in that, in the eleventh aspect, the impregnation and calcination carbonization subsequent thereto are repeated twice or more.

ADVANTAGEOUS EFFECTS OF INVENTION

A carbon fiber-reinforced carbon composite according to the present invention has extremely high longitudinal bending elastic modulus, is easy to manufacture and process, and is free from problems with warping, peeling, and cracking.

That is, a carbon fiber-reinforced carbon composite according to the present invention has a structure in which at least two carbon fiber-reinforced carbon composite layers are stacked, the two carbon fiber-reinforced carbon composite layers being a first carbon fiber-reinforced carbon composite layer in which carbon fibers are oriented in the longitudinal direction of the carbon fiber-reinforced carbon composite and a second carbon fiber-reinforced carbon composite layer different in the arrangement of the carbon fibers from the first carbon fiber-reinforced carbon composite layer, the first carbon fiber-reinforced carbon composite layer being placed on an outermost layer of one or both plate surfaces of the carbon fiber-reinforced carbon composite. The longitudinal bending elastic modulus can be sufficiently ensured due to the first carbon fiber-reinforced carbon composite layer of the outermost layer. The second carbon fiber-reinforced carbon composite layer is stacked on the first carbon fiber-reinforced carbon composite layer and therefore problems with warping and peeling (cracking) can be suppressed, the problems being caused in the case of the first carbon fiber-reinforced carbon composite layer only. In addition, the first carbon fiber-reinforced carbon composite layer of the outermost layer of at least one plate surface is a layer in which the carbon fibers are aligned; hence, gas produced in a calcination or carbonization step can be smoothly discharged through the first carbon fiber-reinforced carbon composite layer and therefore defects, such as interlayer delamination, due to a failure to remove produced gas can be prevented.

In addition, the bending elastic modulus is increased by the alignment direction or arrangement of the carbon fibers in the carbon fiber-reinforced carbon composite layers as described above; hence, carbon fibers with excessively high elastic modulus need not be used. Therefore, a carbon fiber-reinforced carbon composite can be manufactured with good workability.

BRIEF DESCRIPTION OF DRAWINGS

FIG. 1 is a schematic exploded perspective view showing an embodiment of the multilayer configuration of carbon fiber-reinforced carbon composite layers of a carbon fiber-reinforced carbon composite according to the present invention.

FIG. 2 is a perspective view showing an embodiment of a transfer member, according to the present invention, including a carbon fiber-reinforced carbon composite according to the present invention.

DESCRIPTION OF EMBODIMENTS

Embodiments of the present invention are described below in detail.

[Carbon Fiber-reinforced Carbon Composite]

A carbon fiber-reinforced carbon composite (hereinafter referred to as "C/C composite" in some cases) according to the present invention is composed of carbon fibers and a carbonaceous matrix, has a longitudinal length-to-widthwise length ratio of more than 1, and is plate-shaped. The C/C composite is characterized in that at least two C/C composite layers are stacked, the two C/C composite layers being a first carbon fiber-reinforced carbon composite layer ("carbon fiber-reinforced carbon composite layer" and a layer in which carbon fibers are oriented in the longitudinal direction are hereinafter referred to as "C/C composite layer" and "longitudinal C/C composite layer", respectively, in some cases) in which the carbon fibers are placed in the carbonaceous matrix and are oriented in the longitudinal direction and a second C/C composite layer different in the arrangement of the carbon fibers from the first C/C composite layer; the first C/C composite layer forms an outermost layer of at least one plate surface of the C/C composite, that is, the first C/C composite layer is placed on the outermost layer of one or both plate surfaces of the C/C composite; the thickness of the first C/C composite layer is 70% or more of the thickness of the C/C composite; and the longitudinal bending elastic modulus thereof is 150 GPa or more.

In the present invention, the fact that the carbon fibers are oriented in the longitudinal direction of the C/C composite means that the carbon fibers are oriented at an angle within ±10° with respect to the longitudinal direction of the C/C composite (that is, the axis direction of the carbon fibers is present so as to make an angle within ±10° with the longitudinal direction of the C/C composite).

Likewise, the fact that the carbon fibers are oriented in the lateral direction of the C/C composite as described below means that the carbon fibers are oriented at an angle within ±10° with respect to the lateral direction of the C/C composite.

The arrangement of the carbon fibers in the second C/C composite layer is not particularly limited. Examples of the second C/C composite layer include:

(1) a layer (hereinafter referred to as "lateral C/C composite layer" in some cases) in which carbon fibers are oriented in a direction crossing the longitudinal direction and preferably a lateral direction orthogonal to the longitudinal direction, (2) a layer (hereinafter referred to as "cloth C/C composite layer" in some cases) in which carbon fibers are in the form of cloth (woven fabric), and (3) a layer (hereinafter referred to as "random C/C composite layer" in some cases) in which carbon fibers are randomly oriented (nonwoven fabric).

The second C/C composite layer is preferably a lateral C/C composite layer in terms of production efficiency, a reinforcing effect, and the effect of preventing warping or peeling and in view of providing excellent effects in large-size products.

Thus, examples of the C/C composite according to the present invention include a C/C composite 10A including longitudinal C/C composite layers 1 and 1 and a lateral C/C composite layer 2 placed therebetween as shown in FIG. 1(a), a C/C composite 10B including the longitudinal C/C composite layers 1 and 1 and a cloth C/C composite layer 3 placed therebetween as shown in FIG. 1(b), and a C/C composite 10C including the longitudinal C/C composite layers 1 and 1 and a random C/C composite layer 4 placed therebetween as shown in FIG. 1(c).

However, the C/C composite according to the present invention may be as follows: a longitudinal C/C composite layer which is the first C/C composite layer is present on at least one plate surface of the C/C composite and C/C composite layers different from the longitudinal C/C composite layer are stacked in another site. The C/C composite may be a two-layer laminate such as a laminate including a longitudinal C/C composite layer and a lateral C/C composite layer, a laminate including a longitudinal C/C composite layer and a cloth C/C composite layer, or a laminate including a longitudinal C/C composite layer and a random C/C composite layer or a laminate including four or more layers.

In the case of including four or more C/C composite layers, a longitudinal C/C composite layer may be present on a portion other than the outermost layer.

In the present invention, the term "outermost layer" refers to a layer on the surface side of the C/C composite, which is composed of the carbon fibers and the carbonaceous matrix, and does not refer to a surface layer formed on it by plating, vapor deposition, coating, or the like. That is, in the C/C composite according to the present invention, a longitudinal C/C composite layer which is the outermost layer can be subjected to surface treatment such as plating and such a surface treatment layer does not apply to the outermost layer.

In the C/C composite according to the present invention, the thickness of a longitudinal C/C composite layer that is the first C/C composite layer, which forms the outermost layer, is important in sufficiently increasing the longitudinal bending elastic modulus of the C/C composite. When the thickness of the longitudinal C/C composite layer is excessively small, a sufficient bending elastic modulus cannot be achieved. The thickness (when the C/C composite includes two or more longitudinal C/C composite layers, the total thickness) of the longitudinal C/C composite layer of the outermost layer is 70% or more of the thickness of the whole C/C composite depending on the configuration (the carbon fiber content, the bulk density, and the like) of the longitudinal C/C composite layer, the type of a C/C composite layer used as the second C/C composite layer, and the overall thickness of the C/C composite. However, when the thickness of the longitudinal C/C composite layer is excessively large, effects of the present invention that are obtained by providing the second C/C composite layer cannot be sufficiently obtained. Therefore, the thickness (when the C/C composite includes two or more longitudinal C/C composite layers, the total thickness) of the longitudinal C/C composite layer is preferably 70% to 90% and particularly preferably 75% to 85% of the overall thickness of the C/C composite.

When the FAW (the weight of the carbon fibers per unit area) of the longitudinal C/C composite layer that is the first C/C composite layer of the C/C composite according to the present invention is excessively low, the longitudinal bending elastic modulus cannot be sufficiently increased. However, when the FAW thereof is excessively high, the amount of the carbonaceous matrix is small; hence, the fibers are bared, poor appearance or dust is caused, or interlayer delamination occurs in some cases. This is disadvantageous. Thus, the FAW (when the C/C composite includes two or more longitudinal C/C composite layers, the total FAW) of the longitudinal C/C composite layer of the first C/C composite layer is preferably 1,000 $g/m^2$ to 20,000 $g/m^2$ and particularly preferably 5,000 $g/m^2$ to 15,000 $g/m^2$. Furthermore, when the FAW of the second C/C composite layer is excessively small, the effect of preventing warping or peeling by providing the second C/C composite layer cannot be sufficiently obtained. However, when the FAW thereof is excessively high, the amount of the carbonaceous matrix is small; hence, the interlayer adhesion is reduced or the longitudinal bending elastic modulus is reduced in some cases. This is disadvantageous. Thus, the FAW of the second C/C composite layer is preferably 200 $g/m^2$ to 5,000 $g/m^2$ and particularly preferably 400 $g/m^2$ to 4,000 $g/m^2$.

Furthermore, the FAW of the C/C composite according to the present invention is preferably 1,200 $g/m^2$ to 25,000 $g/m^2$ and particularly preferably 5,400 $g/m^2$ to 19,000 $g/m^2$ in order to meet the FAW of the first C/C composite layer and that of the second C/C composite layer.

Pitch-based carbon fibers derived from coal-tar pitch, petroleum-tar pitch, or the like are preferably used as the carbon fibers of the C/C composite according to the present invention because the elastic modulus is high, the carbon content is high, and the chemical stability of composite materials is maintained. The carbon fibers may be PAN-based carbon fibers having an elastic modulus comparable to that of the pitch-based carbon fibers. The tensile elastic modulus of the carbon fibers is preferably 500 GPa or more and particularly preferably 600 GPa or more. Incidentally, carbon fibers in carbon fiber woven fabric for a prepreg for a cloth C/C composite layer for forming the second C/C composite layer as described below are preferably the pitch-based carbon fibers and are also preferably the PAN-based carbon fibers in some cases.

[Method of Manufacturing C/C Composite]

A method of manufacturing the C/C composite according to the present invention is not particularly limited. As this method, the following method is cited: a method in which a carbon fiber-reinforced resin composite sheet (hereinafter referred to as "first prepreg" in some cases) and a carbon fiber-reinforced resin composite sheet (hereinafter referred to as "second prepreg" in some cases) are prepared, a necessary number of prepregs are stacked, a prepreg laminate obtained thereby is hot-pressed into a carbon fiber-reinforced resin form (hereinafter referred to as "C/P form" in some cases), and the C/P form is carbonized by calcination and is then densified.

{Manufacture of Prepreg}

The resin content of each of the first prepreg and the second prepreg is preferably 15% to 45% by weight and particularly preferably 25% to 35% by weight.

When the resin content of each prepreg is excessively large, the content of the carbon fibers is relatively small and therefore a reinforcing effect due to the carbon fibers cannot be sufficiently obtained. When the resin content of the prepreg is excessively small, the amount of the carbonaceous matrix in the obtained C/C composite is small and therefore the obtained C/C composite is brittle in some cases.

One or more thermosetting resins such as phenol resins and furan resins can be used as resin impregnated in the carbon fibers.

These resins are used in the form of an impregnating solution, having appropriate viscosity, prepared by dissolving or dispersing each resin in a solvent such as alcohol, acetone, or anthracene oil.

Incidentally, pitch derived from petroleum, coal, or the like can be used instead of a thermosetting resin.

Furthermore, in both of the first prepreg and the second prepreg, the pitch-based carbon fibers derived from coal-tar pitch, petroleum-tar pitch, or the like are preferably used as the carbon fibers as described above and the carbon fibers in carbon fiber woven fabric are preferably PAN-based carbon fibers in some cases as described above.

The FAW of each prepreg is arbitrary as long as the preferred FAW of the first C/C composite layer and that of the second C/C composite layer are obtained and the preferred volumetric content of the carbon fibers in the C/C composite according to the present invention is obtained as described below. The FAW of the first prepreg is preferably 200 $g/m^2$ to 500 $g/m^2$ and particularly preferably 250 $g/m^2$ to 450 $g/m^2$. The FAW of the second prepreg is preferably 100 $g/m^2$ to 500 $g/m^2$ and particularly preferably 150 $g/m^2$ to 450 $g/m^2$.

When the FAW of the first prepreg is excessively small, the longitudinal bending elastic modulus of the C/C composite according to the present invention cannot be sufficiently increased. When the FAW of the first prepreg is excessively large, it is difficult to maintain the surface smoothness of the C/C composite.

The second prepreg is used to prevent the warping or peeling of the C/C composite according to the present invention rather than to increase the longitudinal bending elastic modulus thereof. When the FAW thereof is excessively large, the development of high longitudinal bending elastic modulus performance owned by the C/C composite according to the present invention is insufficient. Therefore, the FAW thereof is preferably slightly less than the FAW of the first prepreg. However, when the FAW of the second prepreg is excessively small, the above effect obtained by providing the second prepreg cannot be sufficiently obtained.

<First Prepreg>

The first C/C composite layer is a longitudinal C/C composite layer in which the axis direction of the carbon fibers is oriented in the longitudinal direction of the C/C composite. Thus, the first prepreg is a UD prepreg (unidirectional prepreg) prepared in such a way that a plurality of carbon fiber filaments are aligned in a single direction and the aligned carbon fibers are impregnated with a thermosetting resin.

The fiber diameter and filament number of the carbon fibers used in the unidirectional prepreg are not particularly limited and may be those capable of satisfying the FAW of the first prepreg and the FAW of the first C/C composite layer. The fiber diameter thereof is preferably 5 pm to 15 μm. The filament number thereof is preferably 6,000 to 15,000.

In order to allow the obtained C/C composite to have high longitudinal bending elastic modulus, the carbon fibers in the UD prepreg used for the first C/C composite layer are preferably high in elastic modulus and preferably have a tensile elastic modulus of 400 GPa or more and particularly preferably 600 GPa or more as measured with a universal testing machine in accordance with JIS R 7606. When the tensile elastic modulus of the carbon fibers is excessively high, the handleability and workability thereof are poor. Therefore, the tensile elastic modulus is preferably 800 GPa or less.

<Second Prepreg>
(Prepreg for Lateral C/C Composite Layer)

A lateral C/C composite layer as the second C/C composite layer is a C/C composite layer in which the carbon fibers are oriented in a direction orthogonal to the orientation direction of the carbon fibers in the longitudinal C/C composite layer for the first C/C composite layer. Thus, a prepreg for the lateral C/C composite layer may be one prepared similarly to the first prepreg and may be used such that the orientation direction of the carbon fibers is orthogonal to the first prepreg when the prepreg laminate is manufactured by stacking prepregs.

Therefore, in the case of providing the lateral C/C composite layer as the second C/C composite layer, the prepreg for the lateral C/C composite layer need not be separately manufactured and a prepreg for a longitudinal C/C composite layer may be used in such a way that the orientation of the carbon fibers is changed during stacking. This is preferable in that the manpower to manufacture a prepreg for the second C/C composite layer can be saved.

(Prepreg for Cloth C/C Composite Layer)

A cloth C/C composite layer-purpose prepreg for forming the cloth C/C composite layer as the second C/C composite layer can be manufactured by impregnating woven fabric of the carbon fibers with a thermosetting resin.

The woven fabric of the carbon fibers may be one capable of satisfying the FAW of the second prepreg and the FAW of the second C/C composite layer. The texture thereof or the diameter of the carbon fibers is not particularly limited. For example, those, used in the first prepreg, having a fiber diameter of 5 μm to 15 μm are preferably used as the carbon fibers. For example, woven fabric such as plain-weave fabric or satin weave fabric can be used as the woven fabric of the carbon fibers.

(Prepreg for Random C/C Composite Layer)

A random C/C composite layer as the second C/C composite layer can be manufactured in such a way that, for example, a bundle of carbon fibers having a fiber diameter of about 5 μm to 15 μm is cut into about 10-50 mm pieces, the pieces are split into fibers, the fibers are formed into a two-dimensional random sheet (nonwoven fabric) capable of satisfying the FAW of the second prepreg and the FAW of the second C/C composite layer, and the two-dimensional random sheet is impregnated with a thermosetting resin.

{Stacking of Prepregs}

The first prepreg and the second prepreg are used and a necessary number of prepregs are stacked, whereby the prepreg laminate is obtained.

The number of the stacked prepregs is appropriately adjusted such that the thickness and FAW of each layer of the manufactured C/C composite are satisfied.

{Formation of Prepreg Laminate}

The prepreg laminate is then hot-pressed into the C/P form. The hot-pressing conditions depend on a thermosetting resin used and are usually a temperature of 100° C. to 500° C., preferably 100° C. to 200° C., and a pressure of 1 kg/cm² to 20 kg/cm², preferably about 5 kg/cm² to 10 kg/cm². Furthermore, the holding time during hot pressing is about 60 minutes to 180 minutes.

{Calcination/Carbonization of C/P Form}

The C/P form is calcined at a temperature of 700° C. to 2,500° C., preferably about 700° C. to 1,600° C., in an inert gas atmosphere such as a nitrogen gas, whereby resin is carbonized (in the present invention, one obtained by calcination and carbonization is referred to as "preform").

{Densification of Preform}

In the present invention, in order to increase the bulk density of the obtained C/C composite and in order to sufficiently enhance the longitudinal bending elastic modulus and other mechanical properties, the obtained preform is preferably densified by calcination and carbonization.

The following method is cited as a densification method: a method in which an impregnation/carbonization process is performed at least once in such a way that after a preform is impregnated with an impregnating material such as a thermosetting resin including a phenol resin and/or a thermosetting substance including tar and pitch, the impregnating material is carbonized by calcination; a CVD method in which carbon is obtained by thermally decomposing a hydrocarbon gas such as methane or propane; or the like. In particular, the following method is preferred because a high-heat capacity, high-thermal conductivity C/C composite is obtained: a method in which an impregnation/carbonization process is performed at least once in such a way that pitch is impregnated as an impregnating material and is carbonized.

The calcination temperature in a carbonization process is preferably 700° C. to 2,500° C. and particularly preferably about 700° C. to 1,600° C. An atmosphere in the carbonization process is preferably an inert gas atmosphere such as a nitrogen gas.

In the present invention, the number of times the impregnation/carbonization process is performed is adjusted, so that the C/C composite can be obtained so as to have a bulk density and porosity suitable for the present invention as described below. In particular, the larger the number of times the impregnation/carbonization process is performed is, the higher the bulk density tends to be and the less the porosity tends to be.

After densification treatment is performed in this way, graphitization treatment is further performed as required, whereby the C/C composite according to the present invention is obtained. The C/C composite contains carbon derived from a thermosetting resin, pitch, or the like as the carbonaceous matrix.

Graphitization treatment can be performed in such a way that, for example, the densified C/C composite is calcined at a temperature of 1,600° C. to 2,800° C. in an inert gas atmosphere.

[Size and Shape of C/C Composite]

The C/C composite according to the present invention has a longitudinal length-to-widthwise (lateral) length ratio (longitudinal/widthwise) of more than 1 and is an elongate plate-shaped member. This ratio is preferably 5 or more and more preferably 20 or more. An effect of the present invention, that is, the effect that the increase of the longitudinal/widthwise length ratio increases the longitudinal bending elastic modulus can be significantly obtained. In view of industrial production efficiency and applications of the C/C composite, this ratio is 100 or less, preferably 90 or less, and more preferably 80 or less.

The longitudinal length, widthwise (lateral) length, and thickness of the C/C composite according to the present invention are not particularly limited and are appropriately determined depending on applications and the size of a production facility.

In general, the longitudinal length of the C/C composite according to the present invention is usually 200 mm to 5,000 mm, preferably 500 mm to 2,000 mm, more preferably 800 mm to 1,800 mm, and particularly preferably 1,000 mm to 1,500 mm; the widthwise (lateral) length thereof is usually 10 mm to 100 mm, preferably 20 mm to 80 mm, more preferably 25 mm to 70 mm, and particularly preferably 30 mm to 60 mm; and the thickness thereof is usually 1 mm to 40 mm, preferably 1 mm to 30 mm, especially preferably 1 mm to 25 mm, more preferably 5 mm to 25 mm, and particularly preferably 8 mm to 20 mm. When the thickness of the C/C composite is excessively small, the stiffness thereof is insufficient. When the thickness of the C/C composite is excessively large, the weight thereof is excessive. Therefore, applications thereof are limited.

Incidentally, the longitudinal direction of the C/C composite according to the present invention is the longest portion thereof and is a direction in which the axis direction of the carbon fibers in the first C/C composite layer is oriented, the thickness direction thereof is a direction in which the first C/C composite layer and the second C/C composite layer are stacked, and the width direction (lateral direction) thereof is a direction orthogonal to the longitudinal direction and the thickness direction.

[Physical Properties of C/C Composite]

<Bending Elastic Modulus>

The C/C composite according to the present invention is characterized in that the longitudinal bending elastic modulus thereof is 150 GPa or more. When the longitudinal bending elastic modulus is less than 150 GPa, the bending stiffness and vibration damping properties are insufficient. Therefore, for example, the deflection under load and the vibration are large upon carrying a burden in applications as transfer members and stable use is difficult.

The longitudinal bending elastic modulus of the C/C composite according to the present invention is preferably high in view of stability and the like during usage. However, when the longitudinal bending elastic modulus thereof is excessively high, disadvantages such as difficulty in machining including cutting arise. Therefore, the longitudinal bending elastic modulus thereof is usually 350 GPa or less. The longitudinal bending elastic modulus of the C/C composite according to the present invention is preferably 160 GPa to 300 GPa, more preferably 180 GPa to 280 GPa, and particularly preferably 180 GPa to 250 GPa.

Incidentally, the longitudinal bending elastic modulus of the C/C composite is measured by a method specified in the term of an example below.

<Bending Strength>

As with the above bending elastic modulus, the C/C composite according to the present invention preferably has high longitudinal bending strength in view of impact resistance. However, when the longitudinal bending strength thereof is excessively high, the stiffness is reduced in some cases. This is disadvantageous.

The longitudinal bending strength of the C/C composite is preferably 100 MPa to 700 MPa, more preferably 200 MPa to 600 MPa, and particularly preferably 300 MPa to 500 MPa.

Incidentally, the longitudinal bending strength of the C/C composite is measured by a method specified in the term of an example below.

<Bulk Density>

The bulk density of the C/C composite according to the present invention is preferably 1.65 g/cm$^3$ or more. When the bulk density of the C/C composite is less than the above lower limit, any C/C composite having sufficiently high longitudinal bending elastic modulus and other mechanical strength cannot be obtained. The bulk density of the C/C composite is preferably high in view of an increase in mechanical strength. In order to manufacture such a C/C composite with high bulk density, the above calcination, carbonization, and densification steps need to be performed many times. This causes an increase in manufacturing cost. In order to achieve sufficient mechanical strength without causing an excessive increase in manufacturing cost, the bulk density is preferably 1.65 g/cm$^3$ to 1.80 g/cm$^3$ and more preferably 1.68 g/cm$^3$ to 1.75 g/cm$^3$.

The bulk density of the C/C composite is measured by a method specified in the term of an example below.

<Porosity>

For substantially the same reason as the above bulk density, the porosity (void volume fraction) of the C/C composite according to the present invention has a preferred range. When the porosity of the C/C composite is excessively high, any C/C composite having sufficiently high longitudinal bending elastic modulus and other mechanical strength cannot be obtained. The porosity of the C/C composite is preferably low in view of an increase in mechanical strength. In order to manufacture such a C/C composite with low porosity, the above densification treatment needs to be performed several times. This causes an increase in manufacturing cost. The porosity is usually 10% to 25% and preferably 15% to 20% because sufficient mechanical strength can be achieved without causing an excessive increase in manufacturing cost.

The porosity of the C/C composite is measured by a method specified in the term of an example below.

<Volumetric Content of Carbon Fibers>

The volumetric content (the fraction of the volume of the carbon fibers that occupies the volume of the C/C composite) of the carbon fibers in the C/C composite according to the present invention is preferably high because the bending elastic modulus can be increased. However, when the volumetric content thereof is excessively high, the amount of the carbonaceous matrix is relatively reduced and therefore the occurrence of interlayer delamination or the like is concerned. This is disadvantageous. Thus, the volumetric content of the carbon fibers in the C/C composite according to the present invention is 40% to less than 70%, particularly preferably 45% to 65%, and especially preferably 48% to 60%.

The volumetric content of the carbon fibers in the C/C composite is measured by a method specified in the term of an example below.

[Transfer Member]

A transfer member according to the present invention includes the above-mentioned C/C composite according to the present invention.

The longitudinal length of the transfer member according to the present invention is usually 300 mm to 5,000 mm, preferably 500 mm to 4,500 mm, more preferably 1,000 mm to 4,000 mm, and particularly preferably 1,500 mm to 3,700 mm; the widthwise (lateral) length thereof is usually 10 mm to 100 mm, preferably 20 mm to 80 mm, more preferably 25 mm to 70 mm, and particularly preferably 30 mm to 60 mm; and the thickness thereof is usually 5 mm to 100 mm, preferably 10 mm to 80 mm, more preferably 15 mm to 60 mm, and particularly preferably 20 mm to 50 mm depending on applications thereof.

Thus, the transfer member according to the present invention may be manufactured using the single C/C composite, according to the present invention, having the above size only or using a plurality of C/C composites according to the present invention, the C/C composites being joined or spliced together with an adhesive or the like in an appropriate arrangement for the purpose of adjusting the size. In this case, a plurality of C/C composites having the same size and the same layer configuration may be used or those having different sizes or layer configurations may be used.

FIG. 2 is one showing an embodiment of the transfer member, according to the present invention, using the carbon fiber-reinforced carbon composite according to the present invention. FIG. 2(a) shows one including the single C/C composite 10 according to the present invention. The transfer member 11 has the following size: for example, 1,500 mm in length, 50 mm in width, and 15 mm in thickness d.

FIG. 2(b) shows one using six C/C composites 10 according to the present invention, plate surfaces thereof being joined together with an adhesive. This transfer member 12 has the following size: for example, 4,000 mm in length, 30 mm in width, and 50 mm in thickness d.

FIG. 2(c) shows one using four C/C composites 10 according to the present invention, plate surfaces thereof being joined together with an adhesive. This transfer member 13 has the following size: for example, 2,500 mm in length, 45 mm in width, and 20 mm in thickness d.

The transfer member according to the present invention may be subjected to plating such as electroplating or electroless plating or another surface treatment as required. In the case of performing plating, the thickness of a plating layer is usually 1 µm to 100 µm, preferably 3 µm to 50 µm, more preferably 5 µm to 20 µm, particularly preferably 5 µm to 10 µm.

[Applications]

The C/C composite according to the present invention is preferably used as a transfer member for sheet workpieces such as liquid crystal substrates, printed circuit boards, and glass substrates; is not limited to such a transfer member; and is suitable for use in various members which have a large longitudinal/widthwise length ratio, which need to have high mechanical strength, particularly high longitudinal bending elastic modulus, and which need to be lightweight and excellent in heat resistance and corrosion resistance.

EXAMPLES

The present invention is further described below in detail with reference to examples and comparative examples. The present invention is not limited to the examples below unless exceeding the gist thereof.

[Manufacture of Prepregs]

Prepregs used to manufacture C/C composites in the examples and the comparative examples were manufactured as described below.

<Manufacture of UD Prepregs>

Pitch-based carbon fibers ("DIALEAD" produced by Mitsubishi Plastics, Inc., a fiber diameter of 10 µm, a tensile elastic modulus of 640 GPa) with a filament number of 12,000 were arranged in a single direction, were impregnated with a phenol resin diluted with methanol, and were then dried, whereby UD prepregs having an FAW of 400 g/m$^2$, a phenol resin content of 30% by weight, and a thickness of 0.2 mm were obtained.

<Manufacture of Cloth Prepregs>

PAN-based carbon fiber woven fabrics (a fiber diameter of 7 µm, a tensile elastic modulus of 230 GPa, the product name "Pyrofil woven fabric (cloth) TR3110M" manufactured by Mitsubishi Rayon Co., Ltd., plain weave, an FAW of 200 g/m$^2$) were impregnated with a phenol resin diluted with methanol and were then dried, whereby cloth prepregs having an FAW of 200 g/m$^2$, a phenol resin content of 30% by weight, and a thickness of 0.1 mm were obtained.

<Manufacture of Random Prepregs>

Pitch-based carbon fibers (a fiber diameter of 10 µm, a tensile elastic modulus of 196 GPa) with a filament number of 12,000 were cut to a length of 30 mm and were then split with a random webber, whereby sheets in which the pitch-based carbon fibers were two-dimensionally randomly oriented were obtained. The sheets were impregnated with a phenol resin diluted with methanol and were then dried, whereby random prepregs having an FAW of 200 g/m$^2$, a phenol resin content of 30% by weight, and a thickness of 0.1 mm were manufactured.

[Evaluation of Carbon Fiber-reinforced Carbon Composites]

Carbon fiber-reinforced carbon composites manufactured in the examples and the comparative examples were evaluated by methods below. A specimen used for evaluation was obtained from a longitudinal central portion of each of the C/C composites (original plates) manufactured in the examples and the comparative examples by cutting using a wet-type precision cutter (Watercutter Model AC500CFS manufactured by Maruto Seiki K. K.). The longitudinal and lateral sizes thereof are as shown in Table 1. The thickness of each specimen is the same as the thickness of a corresponding one of the C/C composites (original plates) shown in Table 1.

For the size of the specimens, the ratio (L/D) of the longitudinal length (L) to the thickness (D) of the specimens was constant. In particular, L/D is approximately equal to 30. Specimens with various lengths were measured, whereby effects of the present invention were confirmed. Incidentally, in evaluation below, three of the specimens were cut and measurement results of the specimens were averaged.

<Bulk Density>

The size (length, width, and thickness) of each bending test specimen was measured with a vernier caliper and they were multiplied by each other, whereby the volume thereof was calculated. The weight thereof was measured with a balance. The measured weight was divided by the calculated volume, whereby the bulk density was calculated.

<Bending Elastic Modulus>

Measurement was performed in accordance with JIS K 7074 except that the size of each specimen was as described above.

<Bending Strength>

Measurement was performed in accordance with JIS K 7074 except that the size of each specimen was as described above.

<Volumetric Content (Vf) of Carbon Fibers>

The weight of carbon fibers was determined by subtracting the weight loss caused by calcining and carbonizing a C/P form from the weight thereof before calcination and carbonization and was divided by the whole volume and the specific gravity of the carbon fibers and the percentage thereof was determined.

<Porosity>

Measurement was performed with a mercury porosimeter.

<Layer Thickness>

Three randomly selected points were measured for thickness by microscopic observation and the average thereof was determined.

[Manufacture and Evaluation of C/C Composites]

Example 1

Two multilayer prepregs were each prepared in such a way that two UD prepregs were stacked such that the alignment direction of carbon fibers coincided with the longitudinal direction. A single UD prepreg was sandwiched between the multilayer prepregs such that the alignment direction of the carbon fibers was orthogonal (about 90°) to the longitudinal direction, whereby a prepreg laminate was obtained. A phenol resin was cured in such a way that the prepreg laminate was held at a temperature of 177° C. under a pressure of 6 kg/cm$^3$ for 120 minutes in an autoclave system, whereby a C/P form with Vf shown in Table 1 was obtained.

After the C/P form was carbonized in such a way that the C/P form was calcined at 750° C. for five hours in a nitrogen gas atmosphere, the C/P form was impregnated with pitch and was then calcined again under the same conditions. The pitch impregnation and calcination steps were performed several times, whereby a C/C composite having layer configuration, size, and FAW shown in Table 1 was obtained.

Evaluation results of the obtained C/C composite are shown in Table 1.

Example 2

Two multilayer prepregs were each prepared in such a way that two UD prepregs were stacked such that the alignment direction of carbon fibers coincided with the longitudinal direction. A single cloth prepreg was sandwiched between these multilayer prepregs, whereby a prepreg laminate was obtained.

A phenol resin was cured in such a way that the prepreg laminate was held at a temperature of 200° C. under a pressure of 15 kg/cm$^3$ for 30 minutes using a press, whereby a C/P form with Vf shown in Table 1 was obtained.

The C/P form was calcined, impregnated with pitch, and then calcined in substantially the same way as that described in Example 1, whereby a C/C composite having layer configuration, size, and FAW shown in Table 1 was obtained.

Evaluation results of the obtained C/C composite are shown in Table 2.

Examples 3 and 4

C/P forms with Vf shown in Table 1 and C/C composites having layer configuration, size, and FAW shown in Table 1 were obtained in substantially the same way as that described in Example 1 except that the number of stacked UD prepregs was varied.

Evaluation results of obtained C/C composites are shown in Table 2.

Example 5

The curing of a phenol resin, formation, calcination, pitch impregnation, and calcination were performed in substantially the same way as that described in Example 2 except that a prepreg laminate was prepared in such a way that a single UD prepreg was used such that the alignment direction of carbon fibers coincided with the longitudinal direction and the UD prepreg and a single random prepreg were stacked, whereby a C/P form with Vf shown in Table 1 and a C/C composite having layer configuration, size, and FAW shown in Table 1 were obtained.

Evaluation results of the obtained C/C composite are shown in Table 2.

Example 6

Two multilayer prepregs were each prepared in such a way that two UD prepregs were stacked such that the alignment direction of carbon fibers coincided with the longitudinal direction. The curing of a phenol resin, formation, calcination, pitch impregnation, and calcination were performed in substantially the same way as that described in Example 2 using a prepreg laminate prepared by sandwiching a single random prepreg between the multilayer prepregs, whereby a C/P form with Vf shown in Table 1 and a C/C composite having layer configuration, size, and FAW shown in Table 1 were obtained.

Evaluation results of the obtained C/C composite are shown in Table 2.

Example 7

A C/P form with Vf shown in Table 1 was obtained in substantially the same way as that described in Example 2 except that the number of stacked UD prepregs was varied. Calcination, pitch impregnation, and calcination were performed in substantially the same way, whereby a C/C composite having layer configuration, size, and FAW shown in Table 1 were obtained. Incidentally, fine cracks were observed in this C/C composite.

Evaluation results of the obtained C/C composite are shown in Table 2.

Comparative Examples 1 and 2

C/P forms with Vf shown in Table 1 and C/C composites having layer configuration, size, and FAW shown in Table 1 were obtained in substantially the same way as that described in Example 6 except that the number of stacked UD and random prepregs was varied.

Evaluation results of the obtained C/C composite are shown in Table 2.

Comparative Example 3

The curing of a phenol resin, formation, calcination, pitch impregnation, and calcination were performed in substantially the same way as that described in Example 2 using a prepreg laminate that was prepared by sandwiching two UD prepregs between two random prepregs such that the alignment direction of carbon fibers coincided with the longitudinal direction, whereby a C/P form with Vf shown in Table 1 and a C/C composite having layer configuration, size, and FAW shown in Table 1 were obtained.

Evaluation results of the obtained C/C composite are shown in Table 2.

Incidentally, in Table 1, a C/C composite layer which was formed using a UD prepreg and in which carbon fibers are oriented in the longitudinal direction is referred to as "UD (longitudinal)", a C/C composite layer in which carbon fibers are oriented in a lateral direction orthogonal to the longitudinal direction is referred to as "UD (lateral)", a C/C composite layer formed using a cloth prepreg is referred to as "cloth", and a C/C composite layer formed using a random prepreg is referred to as "random".

TABLE 1

| | Original plate size (mm) | | | Specimen size (mm) | | | Thickness | | C/P form | |
|---|---|---|---|---|---|---|---|---|---|---|
| | Longitudinal direction | Lateral direction | Thickness | Longitudinal direction | Lateral direction | Multilayer configuration | percentage (%) | FAW (g/m$^2$) | Vf (%) | Forming method* |
| Example 1 | 1600 | 230 | 8.1 | 242 | 15 | UD (longitudinal)) | 40 | 7200 | 54 | A |
| | | | | | | UD (lateral) | 20 | 3600 | | |
| | | | | | | UD (longitudinal)) | 40 | 7200 | | |
| Example 2 | 300 | 300 | 2.4 | 73 | 15 | UD (longitudinal)) | 42 | 1200 | 49 | P |
| | | | | | | Cloth | 16 | 400 | | |
| | | | | | | UD (longitudinal)) | 42 | 1200 | | |
| Example 3 | 300 | 300 | 2.8 | 84 | 15 | UD (longitudinal)) | 37.5 | 1200 | 48 | A |
| | | | | | | UD (lateral) | 25 | 800 | | |
| | | | | | | UD (longitudinal)) | 37.5 | 1200 | | |
| Example 4 | 300 | 300 | 3.2 | 113 | 15 | UD (longitudinal)) | 37.5 | 1200 | 52 | A |
| | | | | | | UD (lateral) | 25 | 800 | | |
| | | | | | | UD (longitudinal)) | 37.5 | 1200 | | |
| Example 5 | 300 | 300 | 3.7 | 110 | 15 | Random | 29 | 1000 | 46 | P |
| | | | | | | UD (longitudinal)) | 71 | 2400 | | |
| Example 6 | 300 | 300 | 2.8 | 83 | 15 | UD (longitudinal)) | 43 | 1200 | 46 | P |
| | | | | | | Random | 14 | 400 | | |
| | | | | | | UD (longitudinal)) | 43 | 1200 | | |
| Example 7 | 1700 | 330 | 5.2 | 155 | 15 | UD (longitudinal)) | 41 | 8000 | 51 | P |
| | | | | | | Cloth | 18 | 3400 | | |
| | | | | | | UD (longitudinal)) | 41 | 8000 | | |
| Comparative Example 1 | 300 | 300 | 2.7 | 81 | 15 | UD (longitudinal)) | 39 | 1200 | 45 | P |
| | | | | | | Random | 22 | 600 | | |
| | | | | | | UD (longitudinal)) | 39 | 1200 | | |
| Comparative Example 2 | 300 | 300 | 3.8 | 113 | 15 | UD (longitudinal)) | 25 | 700 | 43 | P |
| | | | | | | Random | 50 | 1400 | | |
| | | | | | | UD (longitudinal)) | 25 | 700 | | |
| Comparative Example 3 | 300 | 300 | 4.6 | 139 | 15 | Random | 12 | 600 | 50 | P |
| | | | | | | UD (longitudinal)) | 76 | 4000 | | |
| | | | | | | Random | 12 | 600 | | |

*A: Autoclave molding
P: Press molding

TABLE 2

Physical properties and the like of C/C composite

| | Vf (%) | Porosity (%) | Bulk density (g/cm$^3$) | Bending elastic modulus (GPa) | Bending strength (MPa) |
|---|---|---|---|---|---|
| Example 1 | 54 | 15 | 1.74 | 232 | 473 |
| Example 2 | 49 | 15 | 1.68 | 240 | 599 |
| Example 3 | 48 | 15 | 1.69 | 185 | 292 |
| Example 4 | 52 | 30 | 1.65 | 180 | 217 |
| Example 5 | 46 | 30 | 1.58 | 169 | 332 |
| Example 6 | 46 | 18 | 1.63 | 160 | 176 |
| Example 7 | 51 | 18 | 1.68 | 201 | 289 |
| Comparative Example 1 | 45 | 20 | 1.64 | 131 | 234 |
| Comparative Example 2 | 43 | 30 | 1.56 | 138 | 249 |
| Comparative Example 3 | 50 | 15 | 1.63 | 137 | 305 |

From Tables 1 and 2, things below are clear. In Comparative Examples 1 and 2 in which even UD (longitudinal)/random/UD (longitudinal) multilayer configuration is used and in which the thickness of a UD (longitudinal) C/C composite layer is small, high longitudinal bending elastic modulus cannot be achieved. In Comparative Example 3 in which random/UD (longitudinal)/random configuration is used and in which UD (longitudinal) is an intermediate layer, the longitudinal bending elastic modulus is low.

In contrast, the C/C composites of Examples 1 to 6 that include a UD (longitudinal) C/C composite layer placed on an outermost layer of one or both of plate surfaces, high bending elastic modulus, that is, a longitudinal bending elastic modulus of 150 GPa or more can be achieved.

In particular, in the case where UD (longitudinal) C/C composite layers with a large thickness are placed on both plate surfaces of a C/C composite, high bending elastic modulus can be achieved.

From Examples 1 and 7, it is clear that even in a large-size C/C composite, effects of the present invention are exerted. From the comparison between the two, it is clear that Example 1 in which UD (lateral) is an intermediate layer is excellent in physical properties such as bending elastic modulus.

While the present invention has been described in detail using specific embodiments, it is apparent to those skilled in the art that various modifications can be made without departing from the spirit and scope of the present invention.

This application is based on Japanese Patent Application 2011-165542 filed Jul. 28, 2011, the entirety of which is incorporated herein by reference.

REFERENCE SIGNS LIST

1 Longitudinal C/C composite layer(s)
2 Lateral C/C composite layer(s)
3 Cloth C/C composite layer(s)
4 Random C/C composite layer(s)
10, 10A, 10B, 10C C/C composite
11, 12, 13 Transfer member

The invention claimed is:

1. A transfer member comprising a plate-shaped carbon fiber-reinforced carbon composite, wherein the carbon fiber-reinforced carbon composite comprises carbon fibers and a carbonaceous matrix, and has a longitudinal length-to-widthwise length ratio of from 5 to 80, wherein:

the carbon fiber-reinforced carbon composite comprises at least two stacked carbon fiber-reinforced carbon composite layers comprising (a) at least one carbon fiber-reinforced carbon composite layer in which the carbon fibers are oriented in a longitudinal direction in the carbonaceous matrix, and (b) a carbon fiber-reinforced carbon composite layer which is different in arrangement of the carbon fibers from the at least one carbon fiber-reinforced carbon composite layer (a), the at least one carbon fiber-reinforced carbon composite layer (a) forms an outermost layer of at least one plate surface of the carbon fiber-reinforced carbon composite, a total thickness of the layer (a) is 70% or more of a thickness of the carbon fiber-reinforced carbon composite, the carbon fiber-reinforced carbon composite has a longitudinal bending elastic modulus of 150 GPa or more, and the at least one carbon fiber-reinforced carbon composite layer (a) has weight of carbon fibers per unit area (FAW) from 5,000 $g/m^2$ to 15,000 $g/m^2$, the carbon fiber-reinforced carbon composite layer (b) has FAW from 400 $g/m^2$ to 4,000 $g/m^2$, and the carbon fiber-reinforced carbon composite has FAW from 5,400 $g/m^2$ to 19,000 $g/m^2$.

2. The transfer member of claim 1, wherein the carbon fibers in the carbon fiber-reinforced carbon composite layer (b) are oriented in a direction crossing the longitudinal direction.

3. The transfer member of claim 2, wherein the carbon fibers are pitch-based carbon fibers.

4. The transfer member of claim 1, wherein the carbon fibers are pitch-based carbon fibers.

5. The transfer member of claim 4, wherein the carbon fiber-reinforced carbon composite has a volumetric content of the carbon fibers from 40% to 70%.

6. The transfer member of claim 1, wherein the carbon fiber-reinforced carbon composite has a volumetric content of the carbon fibers from 40% to 70%.

7. The transfer member of claim 1, wherein the carbon fiber-reinforced carbon composite has a bulk density of 1.65 $g/cm^3$ or more.

8. The transfer member of claim 1, wherein the carbon fiber-reinforced carbon composite is manufactured by a method comprising:

stacking a plurality of unidirectional layers in which the carbon fibers are aligned in a fiber axis direction such that alignment directions of the carbon fibers of each layer cross each other to form a laminate, hot-pressing the laminate to form a carbon fiber-reinforced resin form, and calcining and carbonizing the carbon fiber-reinforced resin form.

9. The transfer member of claim 8, wherein the layers have a thermosetting resin content of 15% to 45% by weight.

10. The transfer member of claim 8, wherein the method for manufacturing the carbon fiber-reinforced carbon composite further comprises a process in which a preform obtained by calcining and carbonizing the carbon fiber-reinforced resin form is subjected to densification treatment comprising operations (1) and (2) conducted at least once:

(1) impregnating the preform with an impregnating material which is at least one selected from the group consisting of coal-tar pitch, petroleum-tar pitch, and resin, and (2) calcining the preform to carbonize the impregnating material impregnated to the preform.

11. The transfer member of claim 1, wherein the total thickness of the layer (a) is from 70% to 90% of a thickness of the carbon fiber-reinforced carbon composite.

12. The transfer member of claim 1, wherein the total thickness of the layer (a) is from 70% to 85% of a thickness of the carbon fiber-reinforced carbon composite.

13. The transfer member of claim 1, wherein the carbon fiber-reinforced carbon composite has a longitudinal bending elastic modulus of from 150 GPa to 350 GPa.

14. The transfer member of claim 1, wherein the carbon fiber-reinforced carbon composite has a bulk density of from 1.65 $g/cm^3$ to 1.80 $g/cm^3$.

15. The transfer member of claim 1, wherein the carbon fiber-reinforced carbon composite has a volumetric content of the carbon fibers from 45% to 65%.

* * * * *